United States Patent
Jeon et al.

(10) Patent No.: US 11,024,338 B2
(45) Date of Patent: Jun. 1, 2021

(54) DEVICE, METHOD, AND NON-TRANSITORY COMPUTER READABLE MEDIUM FOR PROCESSING MOTION IMAGE

(71) Applicant: Snow Corporation, Seongnam-si (KR)

(72) Inventors: Sang Cheol Jeon, Seongnam-si (KR); Young Hun Kim, Seongnam-si (KR)

(73) Assignee: SNOW Corporation, Gyeonggi-do (KR)

( * ) Notice: Subject to any disclaimer, the term of this patent is extended or adjusted under 35 U.S.C. 154(b) by 0 days.

(21) Appl. No.: 16/278,223

(22) Filed: Feb. 18, 2019

(65) Prior Publication Data

US 2019/0237104 A1     Aug. 1, 2019

Related U.S. Application Data

(63) Continuation of application No. PCT/KR2016/009190, filed on Aug. 19, 2016.

(51) Int. Cl.
   *G11B 27/00*     (2006.01)
   *H04N 5/77*     (2006.01)
   (Continued)

(52) U.S. Cl.
   CPC ............ *G11B 27/005* (2013.01); *G11B 27/00* (2013.01); *G11B 27/10* (2013.01); *H04N 5/77* (2013.01);
   (Continued)

(58) Field of Classification Search
   CPC ....... G11B 27/00; G11B 27/005; G11B 27/10; H04N 5/77; H04N 5/772; H04N 5/783;
   (Continued)

(56) References Cited

U.S. PATENT DOCUMENTS 6,324,335 B1  11/2001 Kanda
7,860,321 B2  12/2010 Watanabe et al.
(Continued)

FOREIGN PATENT DOCUMENTS

CN  103517124 A  1/2014
CN  105531737 A  4/2016
(Continued)

OTHER PUBLICATIONS

Office Action for corresponding Korean Application No. 10-2017-0102569 dated May 4, 2018.
(Continued)

*Primary Examiner* — Thai Q Tran
*Assistant Examiner* — Stephen R Smith
(74) *Attorney, Agent, or Firm* — Harness, Dickey & Pierce, P.L.C.

(57) ABSTRACT

Provided is a non-transitory computer readable medium including computer readable instruction, which when executed by a computer processor cause the computer to read image data extracted from a moving image file stored in the storage medium, a frame rate of the image data, and speed control data of the image data, determine a reproduction speed of a first section of the moving image file by analyzing the speed control data, calculate a change rate of the first section based on the reproduction speed of the first section; and reproduce the moving image file by increasing a reproduction time or removing some of a plurality of frames included in the first section based on the calculated change rate.

12 Claims, 8 Drawing Sheets

(51) Int. Cl.
*H04N 5/915* (2006.01)
*H04N 5/93* (2006.01)
*G11B 27/10* (2006.01)
*H04N 7/01* (2006.01)
*H04N 9/87* (2006.01)

(52) U.S. Cl.
CPC .............. *H04N 5/915* (2013.01); *H04N 5/93* (2013.01); *H04N 7/0127* (2013.01); *H04N 9/87* (2013.01)

(58) Field of Classification Search
CPC .......... H04N 5/907; H04N 5/915; H04N 5/93; H04N 7/0127; H04N 9/87
USPC .............. 386/343, 224, 225, 230, 241, 344; 715/720; 348/142
See application file for complete search history.

(56) References Cited

U.S. PATENT DOCUMENTS

| | | | |
|---|---|---|---|
| 8,023,796 B2 | 9/2011 | Asada et al. | |
| 8,792,778 B2 | 7/2014 | Nakama | |
| 2010/0226624 A1* | 9/2010 | Yamori | G11B 27/005 386/207 |
| 2012/0057843 A1* | 3/2012 | Otani | G11B 27/005 386/224 |
| 2013/0058619 A1* | 3/2013 | Miyakawa | H04N 5/77 386/225 |
| 2013/0080895 A1* | 3/2013 | Rossman | G06F 3/04883 715/720 |
| 2013/0148940 A1* | 6/2013 | Schmit | H04N 5/783 386/230 |
| 2014/0193140 A1* | 7/2014 | Fliderman | H04N 5/783 386/343 |
| 2015/0139627 A1* | 5/2015 | Kawashita | G11B 27/005 386/344 |
| 2015/0350593 A1* | 12/2015 | Arai | G11B 27/34 386/224 |
| 2016/0269674 A1* | 9/2016 | Rathore | H04N 7/0105 |
| 2017/0034444 A1* | 2/2017 | Song | H04N 5/232 |

FOREIGN PATENT DOCUMENTS

| | | |
|---|---|---|
| JP | 2002-152569 A | 5/2002 |
| JP | 2006-93838 A | 4/2006 |
| JP | 2010-226251 A | 10/2010 |
| JP | 2014-086869 A | 5/2014 |
| JP | 2014-154908 A | 8/2014 |
| KR | 10-1168991 B1 | 1/2009 |
| KR | 1366150 B1 | 2/2014 |
| WO | WO-1998/24091 A1 | 6/1998 |
| WO | WO-2016/006835 A1 | 1/2016 |
| WO | WO-2016/098939 A1 | 6/2016 |

OTHER PUBLICATIONS

Final Office Action for corresponding Korean Application No. 10-2017-0102569 dated Nov. 27, 2018.
Office Action for corresponding Korean Application No. 10-2018-0170878 dated Feb. 7, 2020 and English translation thereof.
Office Action for corresponding Chinese Application No. 201680088548.3 dated Sep. 24, 2020 and English translation thereof.
Japanese Office Action dated Jan. 19, 2021 issued in corresponding Japanese Patent Application No. 2019-508903. English translation has been provided.

* cited by examiner

DEVICE, METHOD, AND NON-TRANSITORY COMPUTER READABLE MEDIUM FOR PROCESSING MOTION IMAGE

CROSS-REFERENCE TO RELATED APPLICATIONS

This application is a continuation application under 35 U.S.C. § 365(c) of PCT International Application No. PCT/KR2016/009190, which has an International filing date of Aug. 19, 2016, the content of which is hereby incorporated by reference in its entirety.

BACKGROUND

1. Field

The present disclosure relates to moving image processing apparatus, method, and non-transitory computer readable medium including thereon computer readable instructions, which generate a moving image in which a reproduction speed is adjusted according to a user input received while the moving image is captured.

2. Description of Related Art

In general, image capturing, slow motion or quick motion, is performed by capturing a moving image by capturing the number of frames at about 24 frames per second. However, conventionally a frame rate set during capturing cannot be changed after the capturing.

SUMMARY

Described herein are a moving image processing apparatus, method, and non-transitory computer readable medium including thereon computer readable instructions, which adjust a reproduction speed of a moving image through speed control data generated according to a user input received during capturing.

Also, described herein are a moving image processing apparatus, method, and non-transitory computer readable medium, which are capable of decreasing or increasing a reproduction time by increasing a play count or reproduction time of a frame or by removing a portion of the frame based on speed control data according to an input received from a user, in addition to adjusting a frame rate to increase or decrease a reproduction speed.

According to an aspect of the present disclosure, a non-transitory computer readable medium including computer readable instruction, which when executed by a computer processor cause the computer to read image data extracted from a moving image file stored in the storage medium, a frame rate of the image data, and speed control data of the image data, determine a reproduction speed of a first section of the moving image file by analyzing the speed control data, calculate a change rate of the first section based on the reproduction speed of the first section; and reproduce the moving image file by increasing a reproduction time or removing some of a plurality of frames included in the first section based on the calculated change rate.

When the calculated change rate is smaller than a reference value, the reproducing of the moving image file may include reproducing the moving image file while omitting some of the plurality of frames included in the first section.

When the calculated change rate is greater than a reference value, the reproducing of the moving image file may include reproducing the moving image file while increasing a reproduction time of each of the plurality of frames included in the first section.

The non-transitory computer readable medium further including computer readable instruction, which when executed by a computer processor cause the computer to after the calculating of the change rate, extract audio data from the moving image file, determine whether the extracted audio data and the image data are synchronized, and when it is determined that the extracted audio data and the image data are not synchronized, output the audio data at a reference speed regardless of the change rate.

The non-transitory computer readable medium further including computer readable instruction, which when executed by a computer processor cause the computer to, when it is determined that the extracted audio data and the image data are synchronized, output the audio data by adjusting an output speed according to the change rate.

According to another aspect of the present disclosure, a non-transitory computer readable medium including computer readable instruction, which when executed by a computer processor cause the computer to capture, via a camera, an image frame, receive a user input from a user; generate, by the processor, speed control data set to adjust a reproduction speed of the image frame according to a speed setting per section corresponding to the user input, and generate a moving image file by converting the image frame and the speed control data, and store the moving image file.

According to another aspect of the present disclosure, a moving image processing method using a computer including a storage medium, a display unit, and a processor. The moving image processing method includes reading input image data extracted from a moving image file stored in the storage medium and speed control data of the input image data, determining, by the processor, a reproduction speed of a first section of the moving image file by analyzing the speed control data, calculating, by the processor, a change rate of the first section based on the reproduction speed of the first section, generating, by the processor, output image data by omitting or coping some of a plurality of frames included in the first section based on the calculated change rate, and reproducing, by the display unit, the output image data at a frame rate of the image data.

According to another aspect of the present disclosure, a moving image processing method using a computer including a camera, a user input unit, and a processor. The moving image processing method includes capturing, via the camera, image data, receiving, by the processor, a user input from a user, generating, by the processor, speed control data set to adjust a reproduction speed of the image data according to a speed setting per section the speed setting per section being based on the at least one user input, and storing, by the processor, the speed control data together with the image data.

In addition, other methods, other systems, and non-transitory computer-readable medium having recorded thereon computer programs for executing the methods for implementing the present disclosure are further provided.

Aspects, features, and merits other than those described above will become apparent from the attached drawings, claims, and detailed description.

DETAILED DESCRIPTION

Figure 1:
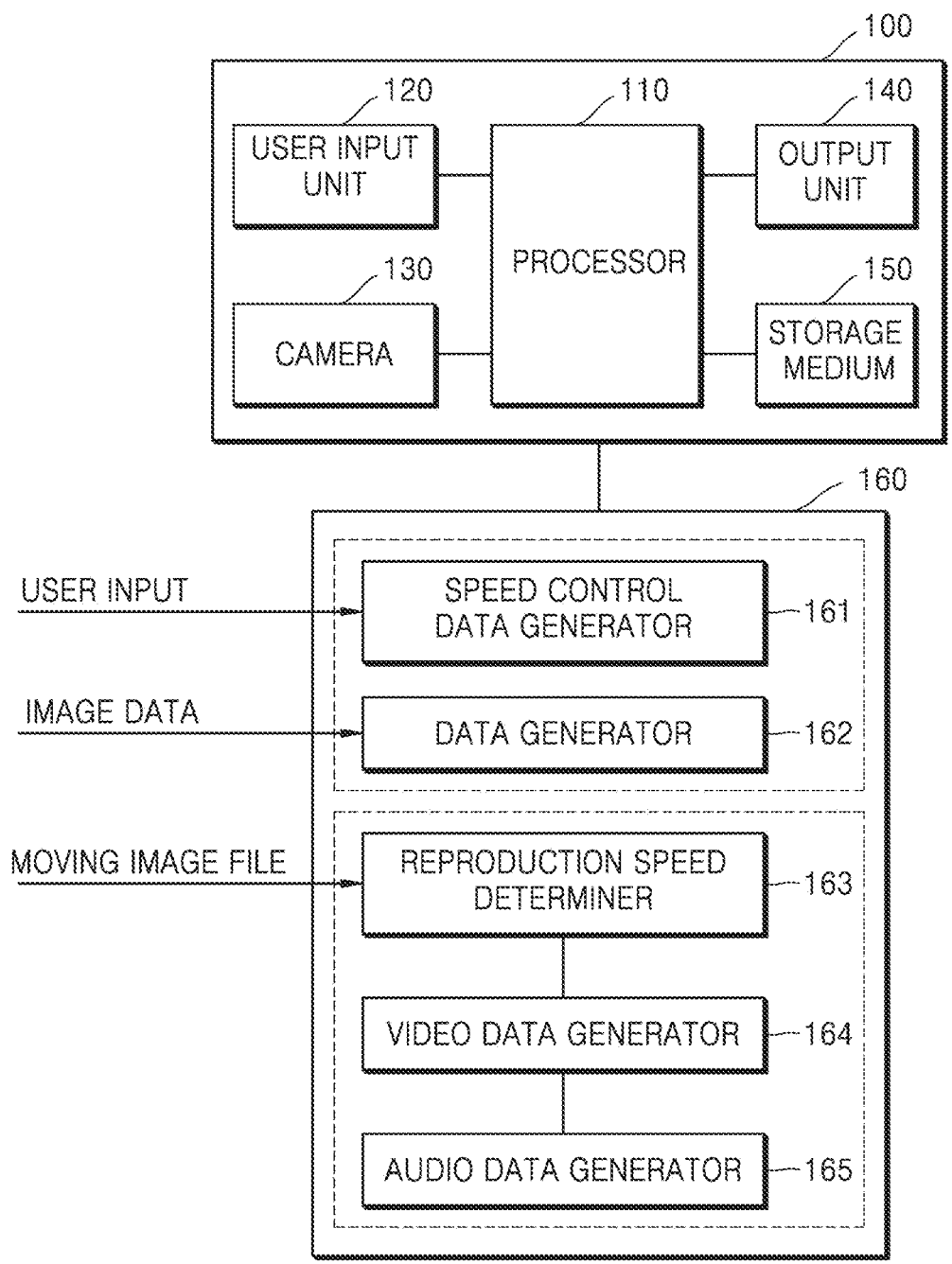
FIG. 1 is a diagram of a user terminal according to an example embodiment of the present disclosure.

As the disclosure allows for various changes and numerous example embodiments, particular example embodiments will be illustrated in the drawings and described in detail in the written description. Advantages and features of the present disclosure and methods of accomplishing the same may be understood more readily by reference to the following detailed description of the example embodiments and the accompanying drawings. In this regard, the present example embodiments may have different forms and should not be construed as being limited to the descriptions set forth herein.

Hereinafter, example embodiments of the present disclosure will be described with reference to accompanying drawings. Those components that are the same or are in correspondence are rendered the same reference numeral regardless of the figure number, and redundant explanations are omitted.

While such terms as "first", "second", etc., may be used to describe various components, such components must not be limited to the above terms. The above terms are used only to distinguish one component from another.

An expression used in the singular encompasses the expression of the plural, unless it has a clearly different meaning in the context.

In the present specification, it is to be understood that terms such as "including" or "having," etc., are intended to indicate the existence of features or components, and are not intended to preclude the possibility that one or more other features or components may exist or may be added.

When a certain example embodiment may be implemented differently, a specific process order may be performed differently from the described order. For example, two consecutively described processes may be performed substantially at the same time or performed in an order opposite to the described order.

In the present specification, "circuit" may include, for example, a hardwired circuit storing an instruction executed by a programmable circuit, a programmable circuit, a state machine circuit, and/or firmware independently or in an arbitrary combination. An application may be implemented in a code or instruction executable on a programmable circuit, such as a host processor or another programmable circuit. A module used in an arbitrary example embodiment of the present disclosure may be implemented as a circuit. A circuit may be implemented as an integrated circuit, such as an integrated circuit chip.

Also, when a part "includes" or "comprises" an element, unless there is a particular description contrary thereto, the part can further include other elements, not excluding the other elements.

The moving image processing apparatus, method, and non-transitory computer readable medium according to example embodiments of the present disclosure can adjust a reproduction speed of a moving image through speed control data generated according to a user input received during capturing.

Also, the moving image processing apparatus, method, and non-transitory computer readable medium according to example embodiments of the present disclosure can decrease or increase a reproduction time by increasing a play count or reproduction time of a frame or by removing a portion of the frame based on speed control data according to an input received from a user, in addition to adjusting a frame rate to increase or decrease a reproduction speed.

FIG. 1 is a diagram of a user terminal 100 according to an example embodiment of the present disclosure.

Referring to FIG. 1, the user terminal 100 according to an example embodiment of the present disclosure may include a processor 110 (or computer processor), a user input unit 120, an output unit 140, a camera 130, and a storage medium 150.

The processor 110 generally controls overall operations of the user terminal 100. For example, the processor 110 may control, in overall, the user input unit 120, the output unit 140, the camera 130, etc. via instructions stored in the storage medium 150. The processor 110 may include any type of devices capable of processing data, such as a processor. Here, a 'processor' may be understood as, for example, a data processing device included in hardware and including a circuit physically configured to perform a function expressed using code or instructions included in a program. Examples of the data processing device included in hardware may include various processing devices such as a microprocessor, a central processing unit (CPU), a processor core, a multiprocessor, an application-specific integrated circuit (ASIC), a field programmable gate array (FPGA), etc., but example embodiments are not limited thereto.

The user input unit 120 denotes a unit for receiving a request from a user, and may include a keypad, a dome switch, a touch pad (contact capacitance type, a pressure resistive film type, an infrared detection type, a surface ultrasonic wave conductive type, an integral tension measuring type, a piezo-effect type, or the like), a jog wheel, a jog switch, or the like, but is not limited thereto.

The output unit 140 outputs information processed or generated by the user terminal 100. For example, the output unit 140 may output a moving image file obtained by the camera 130. Meanwhile, the output unit 140 and a touch pad form a layer structure to be configured as a touch screen. In this case, the output unit 140 may also be used as an input device in addition to an output device. The output unit 140 may include at least one of a liquid crystal display, a thin-film transistor-liquid crystal display, an organic light-emitting diode, a flexible display, a 3-dimensional (3D) display), and an electrophoretic display. Also, according to a configuration of the user terminal 100, the user terminal 100 may include two or more display units. In this case, the two or more display units may be provided to face each other by using a hinge.

The camera 130 may obtain an image frame of a still image or a moving image via an image sensor in a video call mode or photographing mode. An image captured via the image sensor may be processed by the camera 130, the processor 110, or a separate image processor (not shown). The image frame processed by the camera 130 may be stored in the storage medium 150 or externally transmitted. Two or more cameras 130 may be provided based on a configuration of a terminal.

The camera 130 may further include a microphone that receives an external sound signal and processes the external sound signal to electric voice data. The microphone may use various noise removing algorithms for removing noise generated while the external sound signal is received.

The storage medium 150 may store various types of data and software used during operation of the user terminal 100, such as an operating system, an application, a program, a library, and a driver. The storage medium 150 may include at least one type of storage medium from among a flash memory, a hard disk, a multimedia card micro, a card type memory (for example, a security digital (SD) card or an extreme digital (XD) card), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

Programs stored in the storage medium 150 may be classified into a plurality of modules based on functions, and for example, may be classified into a user interface (UI) module, a touch screen module, a notification module, etc. The storage medium 150 may be a non-transitory computer readable medium including thereon computer readable instructions for performing moving image processing. The user terminal 100 may further include a moving image processing apparatus 160 controlling capturing of a moving image and reproducing of the moving image. The moving image processing apparatus 160 may include one or more processors.

Referring to FIG. 1, the moving image processing apparatus 160 may include a speed control data generator 161, a data generator 162, a reproduction speed determiner 163, a video data generator 164, and an audio data generator 165.

The storage medium 150 may include a module that performs a function of converting and storing an image frame obtained from the camera 130 in a moving image file. Here, the speed control data generator 161 and the data generator 162 are components performing functions related to the capturing of a moving image.

The speed control data generator 161 may generate, in relation to the image frame obtained from the camera 130, speed control data corresponding to a user input for adjusting a reproduction speed, the user input received through the user input unit 120. The speed control data generator 161 calculates the reproduction speed in consideration of a direction and length (magnitude) of the user input received through the user input unit 120, and stores the calculated reproduction speed in association with a frame.

The speed control data may include directivity and a changed magnitude of a converted speed. For example, the speed control data may include the directivity of one of fast reproduction, slow reproduction, and reference speed reproduction, and the changed magnitude of one of 0.7× speed, 0.8× speed, 0.9× speed, 1× speed, 1.1× speed, 1.2× speed, and 1.3× speed.

Here, when a drag input is received from the user, the directivity of the speed control data is determined based on a direction of the drag input and the changed magnitude of the speed control data may be determined in proportion to an input length of the drag input. In relation to a change of the speed control data, icons for determining directivity and changed magnitude of a speed may be provided via the output unit 140. The directivity and changed magnitude of the reproduction speed may be determined via an input of selecting the output icons.

Upon receiving a first user input moving in a first direction and setting the reproduction speed to be a first speed by the user, the speed control data generator 161 may generate the speed control data for reproducing, at the first speed, a plurality of image frames corresponding to a first time at which the first user input is received. Upon receiving a second user input moving in a second direction and setting the reproduction speed to be a second speed by the user, the speed control data generator 161 may generate the speed control data for reproducing, at the second speed, a plurality of image frames corresponding to a second time at which the second user input is received.

The speed control data may be generated in frame units or certain time units. One piece of speed control data may be generated in accordance with image frames in which reproduction speeds are the same, or the speed control data may be generated for each image frame.

The data generator 162 converts the image frames including the speed control data into a moving image file. Here, the data generator 162 may generate the moving image file by compressing the image frames and speed control data.

Next, components for performing functions related to reproducing of a moving image will be described.

The reproduction speed determiner 163 extracts and analyzes speed control data included in a moving image file by reading the moving image file stored in the storage medium 150, and determines a reproduction speed for each time section. The reproduction speed determine 163 extracts directivity and magnitude of a speed from the speed control data and determines a reproduction speed corresponding to the directivity and magnitude of the speed.

The video data generator 164 may calculate a change rate corresponding to the determined reproduction speed, and generate and output image frames included in a first section according to the calculated change rate. Here, the video data generator 164 may adjust and output the reproduction speed of the image data according to the speed control data without changing a frame rate.

For example, in relation to a plurality of frames including speed control data having directivity of 'fast reproduction', the video data generator 164 may output the plurality of frames by omitting some of the plurality of frames so as to reduce a reproduction time. For example, the video data generator 164 may calculates a rate of 1/10 as the change rate according to the speed control data of (fast reproduction, 1.1× speed), and output the plurality of frames by omitting some of the plurality of frames according to the change rate. According to the speed control data of (slow reproduction, 0.5× speed), the video data generator 164 may output each of the plurality of frames two times so as to increase the reproduction time by two times.

Also, the video data generator 164 may adjust the reproduction time of the image frames according to the calculated change rate. The reproduction time of each frame may be determined according to a general frame rate. For example, each frame of a moving image captured at a 60-frame rate is reproduced for 1/60 seconds. However, according to example embodiments of the present disclosure, even when the moving image is captured at the 60-frame rate, each frame is reproduced for a time of 1/60×1.1 in a section where a change rate is 1.1× speed. Accordingly, the user terminal 100 according to example embodiments of the present disclosure is capable of expressing an image identical to an original image without distortion due to speed adjustment, by not only adjusting the reproduction time according to the speed control data, but also making the reproduction time of each frame to be constant.

Also, the video data generator 164 may output image data by using an array including a play count of each frame. Each value in the array corresponds to a play count of frames. For example, in accordance with (fast reproduction, 1.1× speed), the video data generator 164 may generate an array of {1,1,1,1,1,1,1,1,1,0} or {0,1,1,1,1,1,1,1,1,1} so as to omit the plurality of frames at a rate of 1/10, and omit or remove a frame corresponding to 0 by using the array. In accordance with the speed control data of (slow reproduction, 0.5× speed), the video data generator 164 may generate an array of {2,2,2,2,2,2,2,2,2,2} so as to increase the reproduction time of each frame by 2 times, and output the each frame two times by using the array. Here, an array number of the array has a pre-set size and may be variously set, such as 10, 5, or the like.

In general, a moving image file is output according to a frame rate at a time of generation. For example, a still image is captured 60 times per second, and the captured still images are output at regular time intervals to reproduce a moving image. For example, a moving image captured at a 60-frame rate generally outputs 60 frames per second at regular time intervals, and in order to increase a reproduction speed of the moving image, the reproduction speed may be increased or decreased via a speed adjusting function during reproduction of the moving image. Also, the reproduction speed of the moving image may be decreased or increased while increasing or decreasing the frame rate of the captured moving image. On the other hand, the moving image processing apparatus 160 according to example embodiments of the present disclosure may adjust reproduction speed of a moving image through speed control data generated according to a user input received during capturing. In particular, the moving image processing apparatus 160 according to example embodiments of the present disclosure may decrease or increase a reproduction time by increasing a play count or reproduction time of a frame or removing some of frames according to a speed control data according to an input received from a user, in addition to adjusting a frame rate to increase or decrease a reproduction speed. In other words, the moving image processing apparatus 160 according to example embodiments of the present disclosure may adjust the reproduction time and speed of the moving image by adjusting the reproduction time of each frame and the play count of each frame.

The audio data generator 165 may calculate a change rate corresponding to the determined reproduction speed, and generate and output audio data included in a first section according to the calculated change rate. Here, the audio data generator 165 may or may not adjust an output speed of the audio data according to the change rate, in consideration of synchronization between the audio data and the image data. When the audio data is one of background music, narration, etc., the audio data generator 165 does not adjust the output speed of the audio data according to the user input received during the capturing. Since the BGM or narration included in the image data does not necessarily need to be synchronized with an image, the audio data generator 165 outputs the BGM or narration according to the original reproduction speed, regardless of the speed control data included in the image data. On the other hand, when the audio data synchronized with the image data is processed, the audio data generator 165 adjusts the output speed of the audio data according to the speed control data. At this time as well, the audio data generator 165 adjusts the output speed of the audio data according to the speed setting per section like the reproduction speed of the image data.

When adjusting the reproduction speed of the moving image according to the user input received during the capturing, the moving image processing apparatus 160 according to example embodiments of the present disclosure may not change the reproduction speed of the audio data that is not synchronized with the image data, such as BGM, and may reproduce the audio data at the original reproduction speed.

Figure 2:
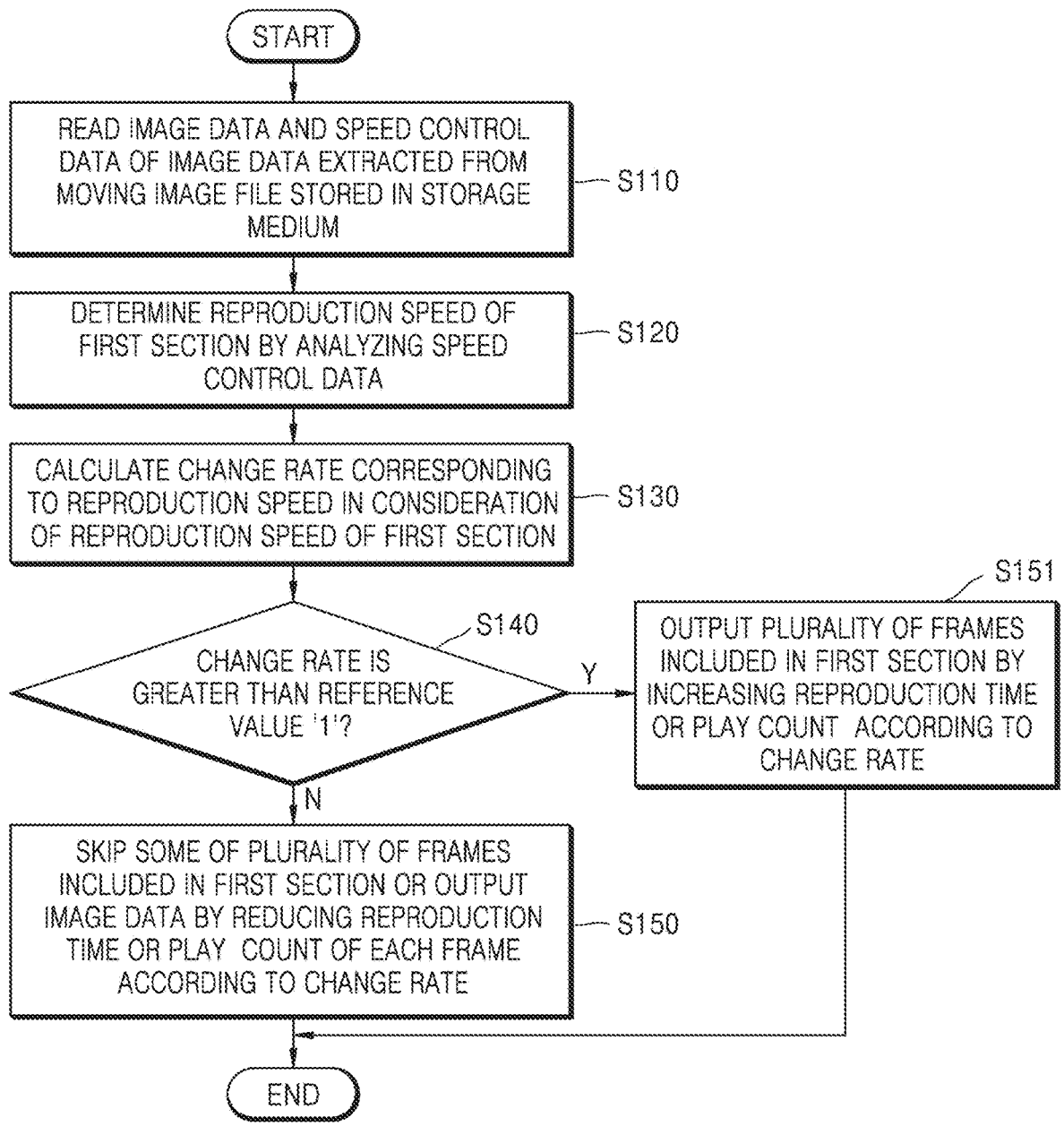
FIGS. 2 through 4 are flowcharts of moving image processing methods according to example embodiments of the present disclosure.
Figure 3:
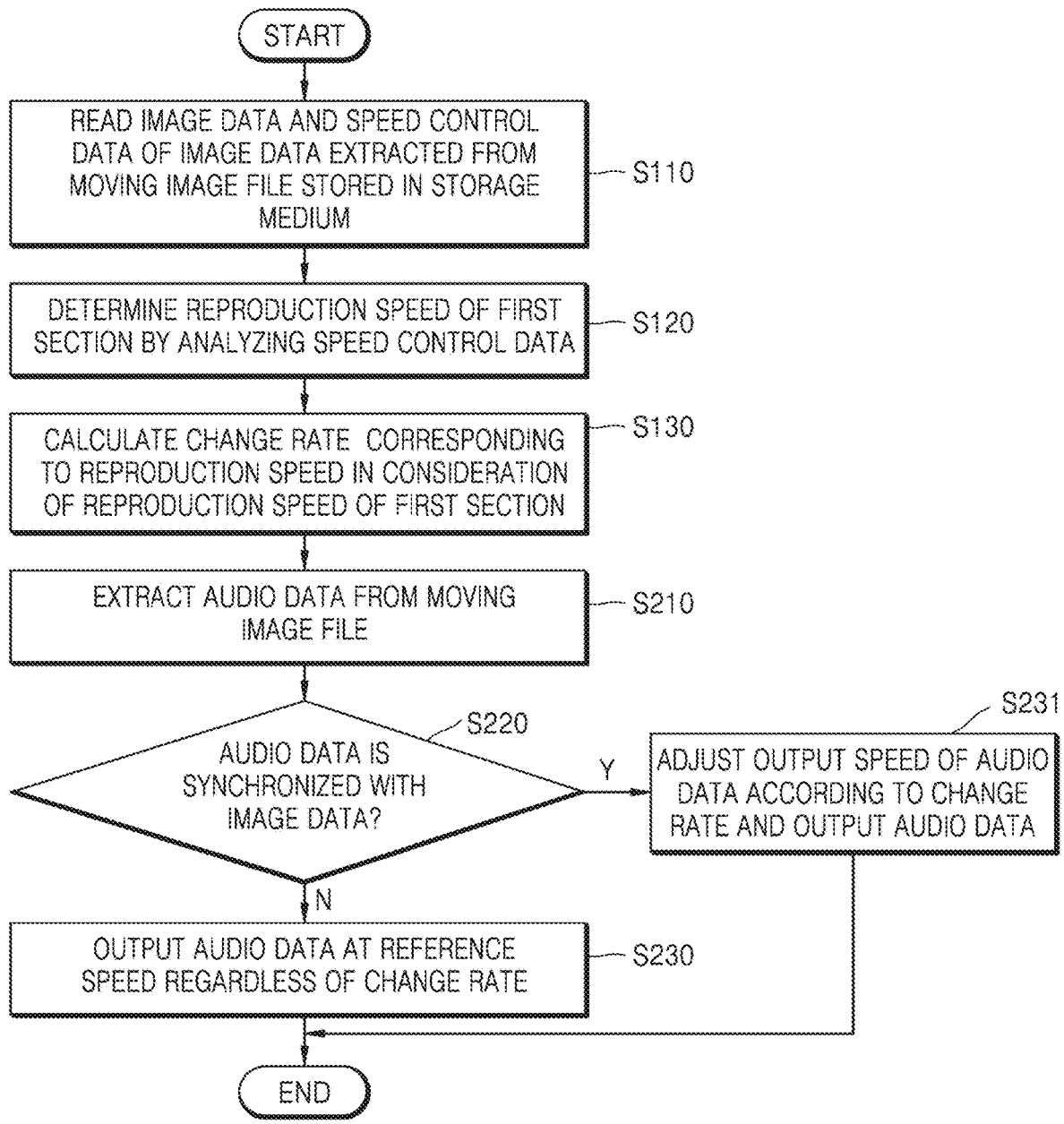
Figure 4:
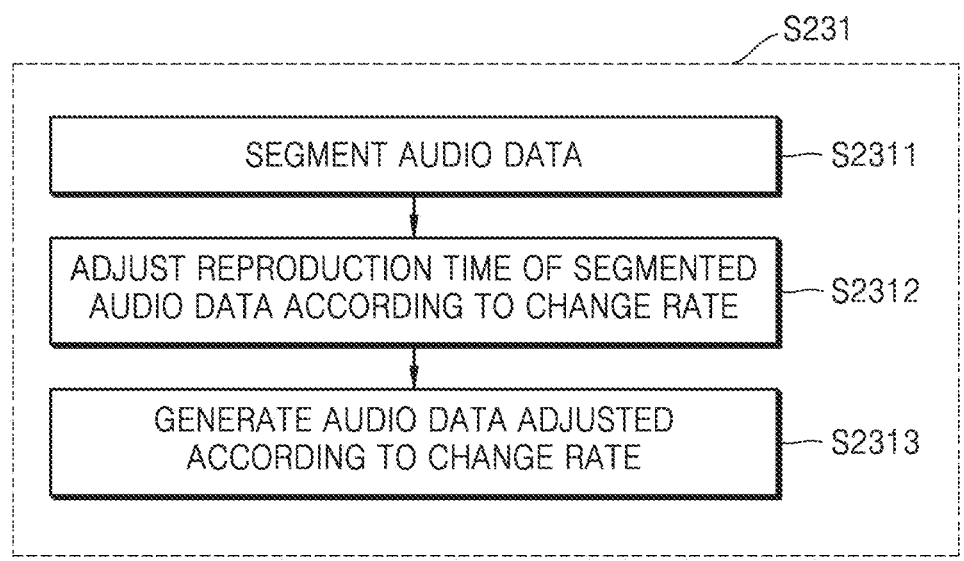

FIGS. 2 through 4 are flowcharts of moving image processing methods according to example embodiments of the present disclosure.

Referring to FIG. 2, the moving image processing method according to example embodiments of the present disclosure may include reading data (operation S110), determining a reproduction speed of a first section by analysing speed control data (operation S120), calculating a change rate corresponding to the reproduction speed in consideration of the reproduction speed of the first section (operation S130), determining whether the change range is greater than a reference speed (operation S140), when it is determined that the change rate is greater than a reference value '1', outputting image data while skipping some of a plurality of frames included in the first section (operation S150), and outputting the plurality of frames included in the first section while increasing a reproduction time of the plurality of frames according to the change rate (operation S160).

In operation S110, the moving image processing apparatus 160 extracts and reads image data and speed control data of the image data from a moving image file stored in a storage medium. The user terminal 100 may extract the image data from the stored moving image file, determine whether the image data is compressed, and decode the compressed image data.

In operation S120, the moving image processing apparatus 160 determines a reproduction speed of a first section by determining the speed control data. The user terminal 100 determines the reproduction speed of the first section to match directivity and magnitude of a speed extracted from the speed control data.

In operation S130, the moving image processing apparatus 160 calculates a change rate corresponding to the reproduction speed in consideration of the reproduction speed of the first section. The change rate is set to, based on a reference value 1, be a real number greater than 1 during fast reproduction and to be a real number smaller than 1 during slow reproduction.

The moving image processing apparatus 160 determines whether the change rate is greater than the reference value '1' in operation S140, and skips some of a plurality of frames according to the change rate or output, reproduce, provide, or display the image data by reducing a reproduction time of each of the plurality of frames in operation S150. As a result, the reproduction time of the image data of the first section is decreased and the reproduction speed of the image data of the first section is increased. Since the image data is output via a general method, details thereof are not provided herein.

In operation S151, the moving image processing apparatus 160 outputs the plurality of frames included in the first section by increasing the reproduction time or play count thereof according to the change rate. The moving image processing apparatus 160 may increase the reproduction time of each frame by the change rate of the first section. Also, the moving image processing apparatus 160 may increase the play count of each frame by the change rate of the first section. Operations S150 and S151, which are the same as those of the video data generator 164, will not be provided again.

The moving image processing method according to example embodiments of the present disclosure may adjust a reproduction speed of a moving image through speed control data generated according to a user input received during capturing. In particular, the moving image processing apparatus 160 according to example embodiments of the present disclosure may decrease or increase a reproduction time by increasing a play count or a reproduction time of a frame or removing some of frames according to the speed control data according to the user input, in addition to adjusting a frame rate to increase or decrease a reproduction speed.

Referring to FIG. 3, the moving image processing method according to example embodiments of the present disclosure may process audio data via a separate method, and in detail, may include, after operations S110 to S130, extracting audio data from the moving image file (operation S210), determining whether the audio data includes BGM (operation S220), outputting the BGM at a reference speed (operation S230), and outputting the audio data by adjusting an output speed of the audio data according to the change rate (operation S231).

In operation S210, the moving image processing apparatus 160 extracts audio data from the moving image file stored in the storage medium. In operation S220, the moving image processing apparatus 160 determines whether the audio data is synchronized with the image data.

In operation S230, when it is determined that the audio data is not synchronized, the moving image processing apparatus 160 may output the audio data according to an original reproduction speed regardless of the speed control data. For example, when the audio data is BGM, narration, or the like, which is irrelevant to the image data, it is not required to synch the audio data with the image data, and thus the moving image processing apparatus 160 may output the audio data according to the original reproduction speed.

In operation S231, when it is determined that the audio data and the image data are synchronized, the moving image processing apparatus 160 adjusts an output speed of the audio data according to the change rate. For example, when the audio data (speaking, singing, crying, or the like) is generated by an object included in the image data, the moving image processing apparatus 160 adjusts the output speed of the audio data according to the change rate.

Operation S231 will now be described in detail with reference to FIG. 4. Operation S231 may further include segmenting the audio data (operation S2311), adjusting a reproduction time of the segmented audio data according to the change rate (operation S2312), and generating one audio data again (operation S2313).

In operation S2311, the moving image processing apparatus 160 may segment the audio data in certain time or certain length units so as to adjust the output speed of the audio data. Here, units of segmenting the audio data may vary according to each frame rate of the image data. For example, audio data included in image data generated at a 60-frame rate is segmented in units of 1/60 seconds. The audio data is segmented according to a frame rate for synchronization with image data.

In operation S2312, the moving image processing apparatus 160 may adjust a reproduction time of the segmented audio data according to the change rate. In other words, when the change rate is 1.1, the reproduction time of the segmented audio data may be 1.1 times of the original reproduction time.

In operation S2313, when the reproduction time is adjusted, the moving image processing apparatus 160 generates one audio data from the segmented audio data. The moving image processing apparatus 160 reproduces the generated audio data. Accordingly, the output speed of the audio data is adjusted according to the speed control data.

Figure 5:
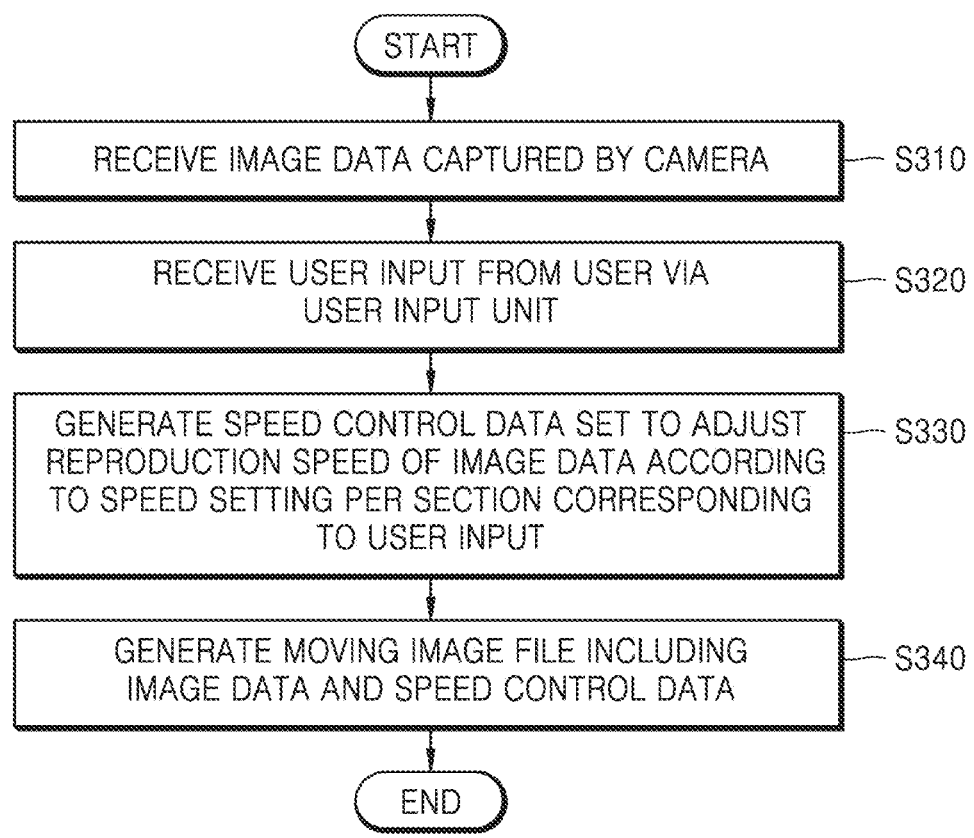
FIG. 5 is a flowchart of a moving image processing method according to example embodiments of the present disclosure.

FIG. 5 is a flowchart of a moving image processing method according to example embodiments of the present disclosure.

Referring to FIG. 5, the moving image processing method according to example embodiments of the present disclosure may include receiving image data (operation S310), receiving a user input (operation S320), generating speed control data (operation S330), and generating a moving image file (operation S340).

In operation S310, the moving image processing apparatus 160 receives image data captured by the camera 130. In operation S320, the moving image processing apparatus 160 receives a user input from a user via the user input unit 120.

In operation S330, the moving image processing apparatus 160 generates speed control data set to adjust a reproduction speed of the image data according to a speed setting per section corresponding to the user input. Since operation S330 is the same as that of the speed control data generator 161, details thereof are not provided again. In operation S340, the moving image processing apparatus 160 generates a moving image file including the image data and the speed control data.

FIG. 6 is a diagram for describing examples of UI provided by the moving image processing apparatus 160.

Figure 6A:
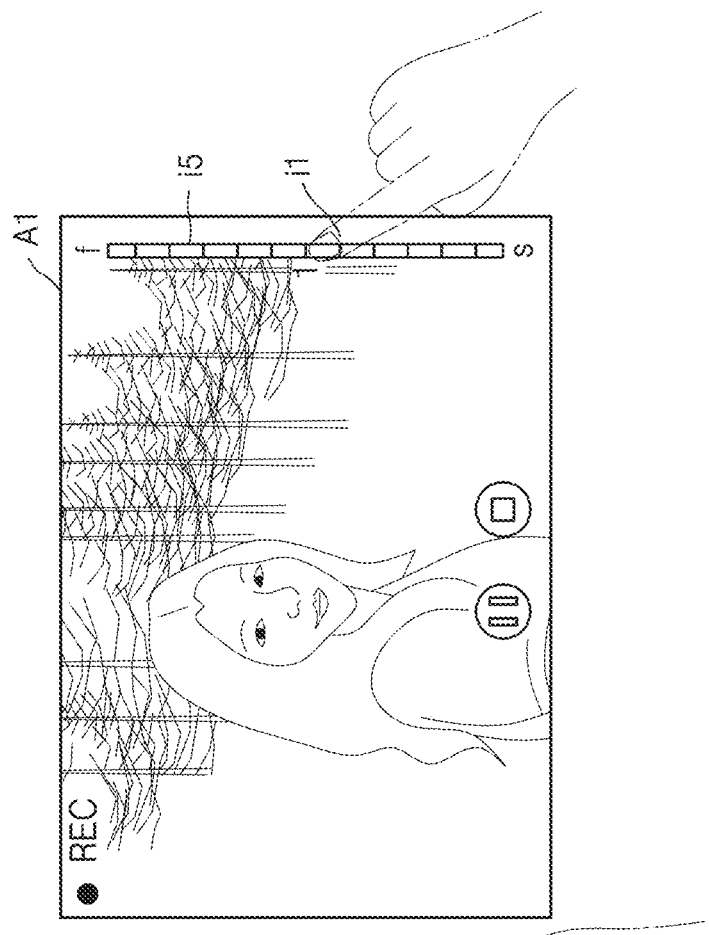
FIGS. 6A and 6B are diagrams for describing examples of user interfaces provided by a moving image processing apparatus according to an example embodiment of the present disclosure.
Figure 6B:
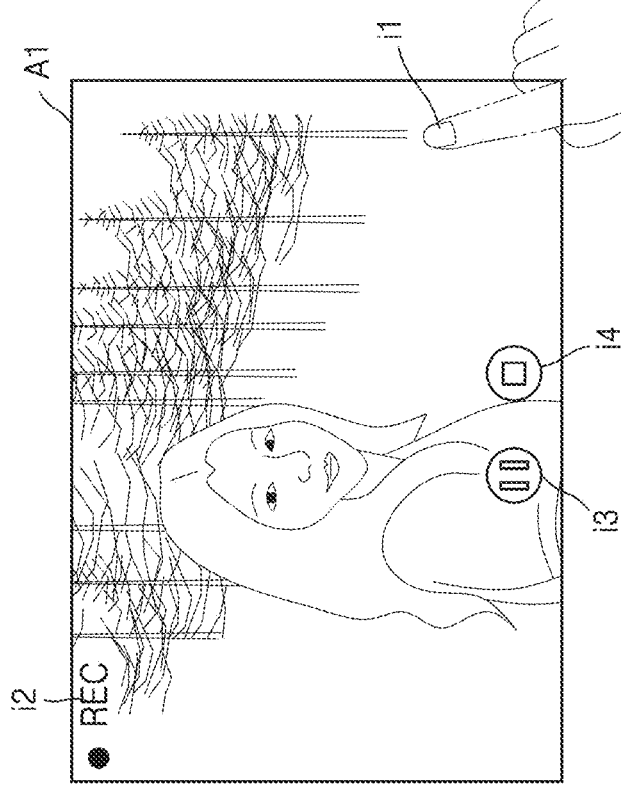

The moving image processing apparatus 160 provides a UI A1 for capturing a moving image as shown in FIG. 6(a). The UI A1 including image data obtained via the camera 130 is displayed via the output unit 140. When a user input i1 of touching one region of the output unit 140 providing the image data for a pre-set period of time, for example, at least 5 seconds, is received, the moving image processing apparatus 160 additionally provides a UI A1 including a speed control bar i5 as shown in FIG. 6(b), which is related to speed control data. The moving image processing apparatus 160 generates speed control data according to the user input i1 on the speed control bar i5 for adjusting a reproduction speed to be fast or slow, and generates a moving image file based on each piece of image data and the speed control data. When the user input i1 of moving upward on the speed control bar i5 is received, the speed control data of increasing the reproduction speed is generated, and when the user input i1 of moving downward on the speed control bar i5 is received, the speed control data of decreasing the reproduction speed is generated. Also, the reproduction speed of the speed control data is changed in proportion to the length the user input i1 is moved. The speed control bar i5 is generated in a vertical direction as shown in FIG. 6(b), but may alternatively generated in a horizontal direction in an bottom or top region in consideration of positions of status icons i2 and i3 for indicating recording and an icon i4 for stopping of recording.

Figure 7:
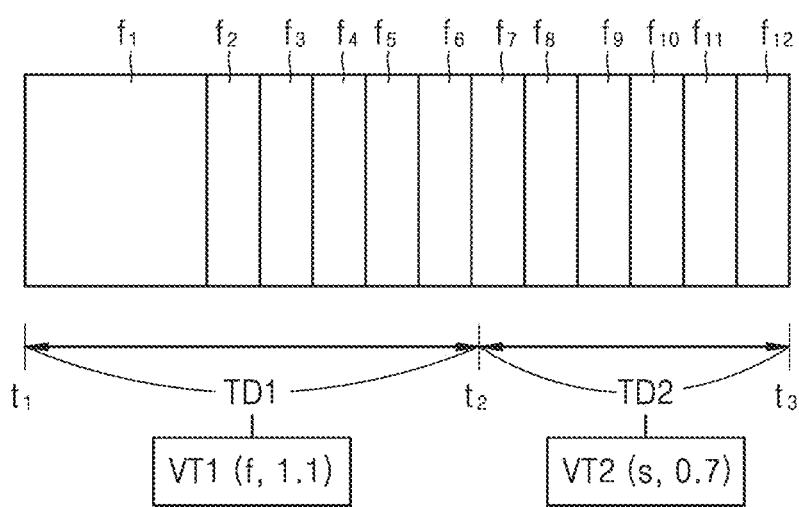
FIG. 7 is a diagram for describing a process of processing an image frame by a moving image processing apparatus according to an example embodiment of the present disclosure.
Figure 8A:
FIGS. 8A-8D are diagrams for describing a process of processing audio data according to an example embodiment of the present disclosure.
Figure 8B:
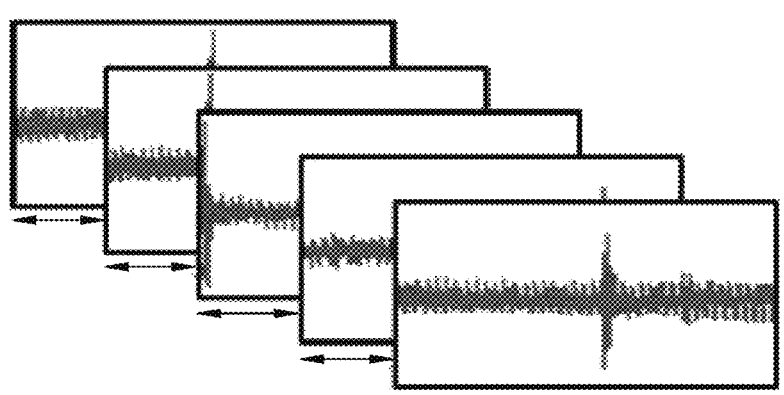
Figure 8C:
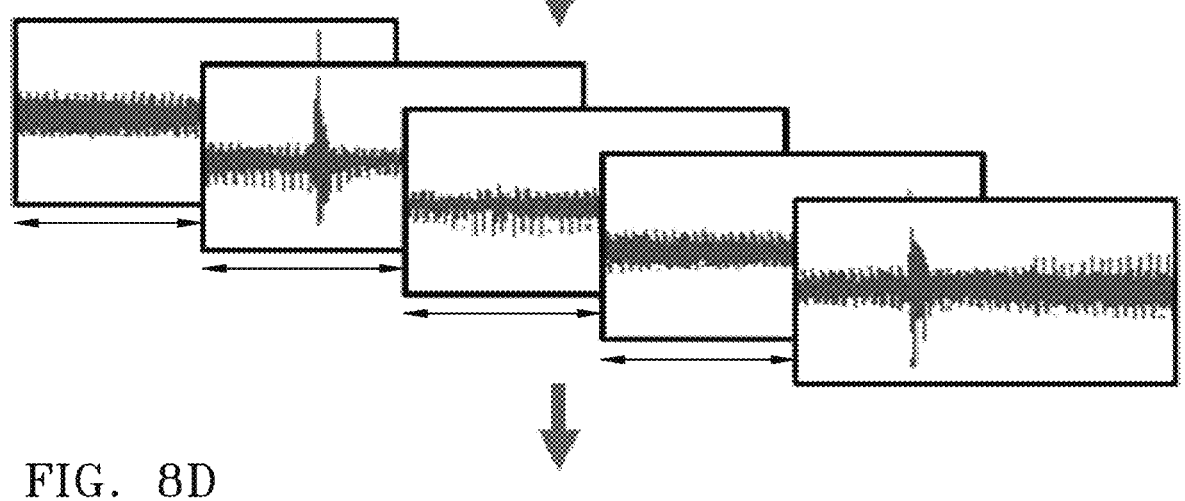
Figure 8D:

FIG. 7 is a diagram for describing a process of processing an image frame by the moving image processing apparatus 160.

Image data including 12 frames f1 through f12 may be generated by the moving image processing apparatus 160, as shown in FIG. 7. At the time of capturing, the image data received a speed control input of fast reproduction at 1.1× speed from times t1 to t2 and a speed control input of slow reproduction at 0.7× speed from times t2 to t3. Accordingly, first speed control data VT1 is generated with respect to the image data in a first time section TD1 from the times t1 to t2, and second speed control data VT2 is generated with respect to the image data in a second time section TD2 from the times t2 to t3.

The moving image processing apparatus 160 may increase a reproduction time of the frames f1 to f6 by 1.1 times in consideration of the first speed control data VT1 in the first time section TD1, and decrease a reproduction time of the frames f7 to f12 by 0.7 times in consideration of the second speed control data VT2 in the second time section TD2, while reproducing the image data.

As such, the moving image processing apparatus 160 may generate a moving image file in which a reproduction speed is adjusted every moment without adjusting a frame rate, according to speed control information input while a moving image is captured.

FIG. 8 is a diagram for describing a process of processing audio data. The moving image processing apparatus 160 may adjust not only a reproduction speed of image data, but also a reproduction speed of audio data, according to speed control data input by a user. Here, the reproduction speed of the audio data is not adjusted uniformly, but may be adjusted or may not be adjusted based on synchronization with the image data.

When the audio data and the image data are synchronized, a reproduction speed of the audio data is adjusted as shown in FIG. 8. As shown in FIG. 8(*b*), the moving image processing apparatus 160 segments original audio data (FIG. 8(*a*)) at regular time intervals or length intervals. As shown in FIG. 8(*c*), the moving image processing apparatus 160 re-generates segmented audio data according to speed control data stored according to a user input received when a moving image file is generated. In detail, the moving image processing apparatus 160 may adjusts a reproduction time of the segmented audio data according to the sped control data stored according to the user input received when the moving image file is generated. In other words, the moving image processing apparatus 160 may increase or reduce the reproduction time of the segmented audio data according to a change rate. As shown in FIG. 8(*d*), the moving image processing apparatus 160 may generate new audio data by adding each piece of segmented audio data in which the reproduction time is adjusted.

One or more of the above example embodiments may be embodied in the form of a non-transitory computer readable medium including thereon computer readable instruction which can be run in a computer through various elements. Examples of the non-transitory computer-readable medium include magnetic media (e.g., hard disks, floppy disks, and magnetic tapes), optical media (e.g., CD-ROMs and DVDs), magneto-optical media (e.g., floptical disks), and hardware devices specifically configured to store and execute program commands (e.g., ROMs, RAMs, and flash memories).

Meanwhile, the computer readable instructions may be specially designed or well known to one of ordinary skill in the computer software field. Examples of the computer readable instructions include mechanical code prepared by a compiler, and high-level languages executable by a computer by using an interpreter.

The particular implementations shown and described herein are illustrative examples of the disclosure and are not intended to otherwise limit the scope of the disclosure in any way. For the sake of brevity, conventional electronics, control systems, software development, and other functional aspects of the systems (and components of the individual operating components of the systems) may not be described in detail. Furthermore, the connecting lines or connectors shown in the various figures presented are intended to represent exemplary functional relationships and/or physical or logical couplings between the various elements. It should be noted that many alternative or additional functional relationships, physical connections, or logical connections may be present in a practical device. Moreover, no item or component is essential to the practice of the disclosure unless the element is specifically described as "essential" or "critical".

The use of the terms "a", "an", "the", and similar referents in the context of describing the disclosure (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. Numerous modifications and adaptations will be readily apparent to those of ordinary skill in this art without departing from the spirit and scope of the present disclosure.

The invention claimed is:

1. A non-transitory computer readable medium including computer readable instruction, which when executed by a computer processor cause a computer to:
   read image data and speed control data for controlling a speed at which the image data is reproduced from a moving image file stored in a storage medium, the speed control data generated based on an input of a user;
   determine a reproduction speed of a first section of the moving image file by analyzing the speed control data;
   calculate a change rate of the first section based on the reproduction speed of the first section; and
   reproduce the moving image file by increasing a reproduction time or removing some of a plurality of frames included in the first section based on the calculated change rate such that reproduction speed of the moving image file is adjusted without adjusting a frame rate of the image data at an image-capturing stage.

2. The non-transitory computer readable medium of claim 1, wherein when the calculated change rate is smaller than a reference value, the reproducing of the moving image file comprises reproducing the moving image file while omitting some of the plurality of frames included in the first section.

3. The non-transitory computer readable medium of claim 1, wherein, when the calculated change rate is greater than a reference value, the reproducing of the moving image file comprises reproducing the moving image file while increasing a reproduction time of each of the plurality of frames included in the first section.

4. The non-transitory computer readable medium of claim 1, further including computer readable instructions which when executed by the computer processor cause the computer to:
   after the calculating of the change rate, extract audio data from the moving image file;

determine whether the extracted audio data and the image data are synchronized; and when it is determined that the extracted audio data and the image data are not synchronized, output the audio data at a reference speed regardless of the change rate.

5. The non-transitory computer readable medium of claim 4, further including computer readable instructions, which when executed by the computer processor cause the computer to:

when it is determined that the extracted audio data and the image data are synchronized, output the audio data by adjusting an output speed according to the change rate.

6. A non-transitory computer readable medium including computer readable instruction, which when executed by a computer processor cause the computer to:

capture, via a camera of the computer, an image frame;

receive at least one user input from a user;

generate speed control data, the speed control data generated to adjust a reproduction speed of the image frame according to a speed setting per section, without adjusting a frame rate of the image frame at an image-capturing state, the speed setting per section being based on the at least one user input;

generate a moving image file by converting the image frame and the speed control data; and store the moving image file.

7. The non-transitory computer readable medium of claim 6, wherein the at least one user input includes a first user input, and when the first user input moving in a first direction is received from the user and the first user input indicates for reproduction to be performed at a first speed, the generating of the speed control data comprises generating the speed control data for setting a reproduction speed of the moving image file to be the first speed for a first time when the first user input is received.

8. The non-transitory computer readable medium of claim 7, wherein, when a second user input moving in a second direction is received from the user and the second user input sets reproduction to be performed at a second speed, the generating of the speed control data comprises generating the speed control data for setting the reproduction speed of the moving image file to be the second speed for a second time when the second user input is received.

9. The non-transitory computer readable medium of claim 8, wherein the storing of the speed control data comprises storing first speed control data for setting the reproduction speed of the moving image file to be the first speed for the first time and second speed control data for setting the reproduction speed of the moving image file to be the second speed for the second time in accordance with image data of the moving image file, according to the first user input and the second user input.

10. The non-transitory computer readable medium of claim 8, wherein the first or second speed has a magnitude that is proportional to an input length of the first or second user input and is set to have one directivity among fast reproduction, slow reproduction, and reference speed reproduction corresponding to the first or second direction.

11. A moving image processing method using a computer, the computer including a storage medium, a display unit, and a processor, the moving image processing method comprising:

reading image data and speed control data for controlling a speed at which the image data is reproduced from a moving image file stored in the storage medium, the speed control data generated based on an input of a user;

determining, by the processor, a reproduction speed of a first section of the moving image file by analyzing the speed control data;

calculating, by the processor, a change rate of the first section based on the reproduction speed of the first section;

generating, by the processor, output image data by omitting or copying some of a plurality of frames included in the first section based on the calculated change rate; and reproducing, by the display unit, the output image data such that a reproduction speed of the output image data is adjusted without adjusting a frame rate of the image data at an image-capturing stage.

12. A moving image processing method using a computer, the computer including a camera, a user input unit, and a processor, the moving image processing method comprising:

capturing, by the camera, image data;

receiving, by the processor, at least one user input from a user;

generating, by the processor, speed control data, the speed control data generated to adjust a reproduction speed of the image data according to a speed setting per section, the speed setting per section being based on the at least one user input such that the reproduction speed of the image data is adjusted without adjusting a frame rate of the image data at an image-capturing stage; and storing, by the processor, the speed control data together with the image data.

* * * * *